United States Patent
Song et al.

(10) Patent No.: US 12,206,265 B2
(45) Date of Patent: Jan. 21, 2025

(54) DECENTRALIZED ACTIVE EQUALIZATION METHOD FOR CASCADED LITHIUM-ION BATTERY PACK

(71) Applicants: CHONGQING UNIVERSITY, Chongqing (CN); STAR INSITIUTE OF INTELLIGENT SYSTEMS, Chongqing (CN); DB (CHONGQING) INTELLIGENT TECHNOLOGY RESEARCH INSTITUTE CO., LTD., Chongqing (CN)

(72) Inventors: Yongduan Song, Chongqing (CN); Jiawei Chen, Chongqing (CN); Li Chen, Chongqing (CN); Qingchao Song, Chongqing (CN)

(73) Assignees: Chongqing University, Chongqing (CN); Star Institute of Intelligent Systems, Chongqing (CN); DB (Chongqing) Intelligent Technology Research Institute Co., Ltd., Chongqing (CN)

( * ) Notice: Subject to any disclaimer, the term of this patent is extended or adjusted under 35 U.S.C. 154(b) by 550 days.

(21) Appl. No.: 17/589,103

(22) Filed: Jan. 31, 2022

(65) Prior Publication Data

US 2022/0255327 A1 Aug. 11, 2022

(30) Foreign Application Priority Data

Feb. 8, 2021 (CN) .......................... 202110171029.6

(51) Int. Cl.
*H02J 7/00* (2006.01)
*H01M 10/0525* (2010.01)
*H01M 10/44* (2006.01)

(52) U.S. Cl.
CPC ....... *H02J 7/0019* (2013.01); *H01M 10/0525* (2013.01); *H01M 10/441* (2013.01)

(58) Field of Classification Search
None
See application file for complete search history.

(56) References Cited

U.S. PATENT DOCUMENTS 5,764,028 A * 6/1998 Freiman .............. H02J 7/00308
320/112
10,449,869 B2 * 10/2019 Kleffel .................. H01G 11/08
(Continued)

*Primary Examiner* — Arun C Williams
(74) *Attorney, Agent, or Firm* — Hunton Andrews Kurth LLP

(57) ABSTRACT

The present disclosure provides a decentralized active equalization method for a cascaded lithium-ion battery pack. The method includes: connecting each battery cell in the cascaded lithium-ion battery pack to a direct current (DC) bus through an equalizer respectively, where each equalizer includes an independent controller, a sampling circuit, a power supply circuit, a drive circuit, and a main circuit; connecting an input terminal of the main circuit to a corresponding battery cell, and connecting an output terminal of the main circuit to the DC bus. The present disclosure solves the technical problem that an existing cascaded lithium-ion battery pack equalization method cannot achieve equalization when a centralized controller failure or a communication failure occurs, improves the reliability of the equalization method, can make the equalizer work at high efficiency by configuring parameters of C, K, and R, and speeds up the equalization or improves the equalization accuracy. The present disclosure uses a bus structure, which can achieve the equalization of all battery cells at the same time, thereby greatly improving the equalization speed. The present disclosure uses a modular design and can be arbitrarily configured according to the scale of the cascaded lithium battery pack, and has strong scalability.

2 Claims, 3 Drawing Sheets

(56) References Cited

U.S. PATENT DOCUMENTS

| | | | | |
|---|---|---|---|---|
| 2003/0044689 A1* | 3/2003 | Miyazaki | ............... | B60L 58/19 |
| | | | | 320/134 |
| 2016/0197499 A1* | 7/2016 | Kaita | ................... | B60L 3/0046 |
| | | | | 320/103 |
| 2018/0233787 A1* | 8/2018 | Kubota | ................ | H01M 10/44 |
| 2021/0320505 A1* | 10/2021 | Kunimitsu | ............ | H01M 10/48 |

* cited by examiner

DECENTRALIZED ACTIVE EQUALIZATION METHOD FOR CASCADED LITHIUM-ION BATTERY PACK

CROSS REFERENCE TO RELATED APPLICATION

This patent application claims the benefit and priority of Chinese Patent Application No. 202110171029.6, filed on Feb. 8, 2021, the disclosure of which is incorporated by reference herein in its entirety as part of the present application.

TECHNICAL FIELD

The present disclosure relates to the technical fields of lithium-ion batteries and power electronics, and in particular to a decentralized active equalization method for a cascaded lithium-ion battery pack.

BACKGROUND ART

Lithium-ion batteries have many advantages and are widely used in various fields. A single battery is not applicable in many fields due to its small capacity and low voltage. Therefore, it is necessary to connect batteries in series to increase the voltage or connect batteries in parallel to increase the capacity to form a battery pack to meet the requirements. Some parameters of each battery cell such as internal resistance, capacity, and voltage will be different during manufacturing or operation, which is called inconsistency. The inconsistency will cause a difference in the voltage and state of charge (SOC) of each battery cell. This may lead to overcharge or overdischarge of individual battery cells in the battery pack, thereby affecting battery life and even causing safety accidents. Therefore, it is important to use an appropriate battery equalization method.

In order to solve the problem of battery equalization, there are generally two solutions. One is passive equalization, which connects the battery cell with a high SOC to a resistor to convert excess energy into heat energy for dissipation. This method is low in cost and simple, and is the mainstream of commercial applications at present. However, the passive equalization method has disadvantages that the excess energy is consumed without cause, resulting in low energy efficiency, and a cooling system is required for cooling when too much energy needs to be dissipated. Another method is active equalization, which transfers energy of the battery cell or battery string to another battery cell or battery pack through an electric energy conversion device, such that the excess energy can be used as much as possible.

At present, most active equalization methods use a centralized sampling circuit to transmit information such as the voltage or SOC of each battery to a controller, and the controller uniformly gives an equalization command by analyzing the voltage or SOC difference of the battery cells. Through this method, the information of all battery cells can be known to make a relatively optimal solution, but because it relies on the information of all battery cells, the equalization will fail when a communication failure occurs or the centralized controller fails.

In order to solve the problem that the battery cannot be equalized when the communication failure occurs or the centralized controller fails in the prior art, many papers and patents have been studied and corresponding solutions have been provided, including the papers as follows.

1. Shen Yongpeng et al. provide the structure of "single decoupling-decentralized controller in series" in the paper "a decentralized active equalization control system for a power battery pack". N battery cell groups are connected in parallel with a decentralized controller respectively, N output terminals of the decentralized controller are connected in series to generate the bus voltage, and the combination of the battery cell group and the decentralized controller is called an intelligent battery cell. Although a centralized controller is omitted to solve the problem that the battery cannot be equalized when the centralized controller fails in the prior art, it still relies on a communication line.

2. In the article "Completely Decentralized Active Balancing Battery Management System" published by Damien F. Frost et al., each battery cell forms an intelligent unit with a controller, an inductor, two power electronic devices, and a sampling circuit, and each intelligent unit is cascaded to form a battery pack. When each intelligent unit is cut in and cut out of the battery pack, its voltage can be sensed by the inductor, such that the terminal voltage of the intelligent unit that is cut in or cut out of the battery pack can be known by calculating the change difference of the inductance voltage waveform. The controller senses the change of the local inductance voltage, so as to know the average voltage of the entire battery pack and its own voltage without relying on any communication to achieve battery equalization. But it has disadvantages that a greater number of intelligent units requires a lower switching frequency to ensure that there are enough sampling points for acquisition of the voltage on the inductor. In addition, its essence is that multiple buck converters are connected in series, so only a part of the battery pack voltage can be used, which may lead to failure to meet the load voltage requirements.

SUMMARY

In view of this, an objective of the present disclosure is to provide a decentralized active equalization method for a cascaded lithium-ion battery pack in view of the problem that in the prior art, batteries cannot be equalized when a communication failure occurs or a centralized controller fails, so as to solve the active equalization problem of the batteries without the communication or centralized controller.

A decentralized active equalization method for a cascaded lithium-ion battery pack of the present disclosure includes connecting each battery cell in the cascaded lithium-ion battery pack to a direct current (DC) bus through an equalizer respectively, where each equalizer includes an independent controller, a sampling circuit, a power supply circuit, a drive circuit, and a main circuit; connecting an input terminal of the main circuit to a corresponding battery cell, connecting an output terminal of the main circuit to the DC bus, supplying power to the controller and the sampling circuit by the power supply circuit, sampling an input voltage, an input current, and an output voltage of the equalizer by the sampling circuit, processing sampling data of the sampling circuit and sending a control signal to the drive circuit by the controller, and generating a drive signal by the drive circuit to drive the main circuit.

The equalizer uses voltage and current double closed-loop control, and the controller calculates a voltage loop reference value $V^*_{Oj}$ according to the following formula:

$$V^*_{Oj}=C+K^*V_{ij}+R^*I_{ij},$$

j is a serial number of the equalizer, and j=1, 2, 3, . . . , n. $V_{ij}$ is the input voltage of the equalizer and a real-time terminal voltage of a corresponding battery cell, and is acquired by the sampling circuit. $I_{ij}$ is an average input current of the equalizer, the average input current is obtained by digital low-pass filtering of the input current acquired by the sampling circuit, the average input current is an equalizing current, and a battery cell discharge direction is positive. C, K, and R are constants.

The current loop reference value is compared with the average input current, a difference is input to a proportional-integral-derivative (PID) regulator of the controller, an output value of the PID regulator is sent to a pulse width modulation (PWM) generator of the controller, and the PWM generator generates a PWM signal and then inputs the PWM signal to the drive circuit so as to generate a drive signal to drive the main circuit.

A control strategy of the equalizer includes the following steps:

when an absolute value of the equalizing current is less than $I_{off}$ and an absolute value of a difference between the voltage loop reference value and the output voltage of the equalizer is less than $V_{off}$, turning off the drive circuit and the PID regulator of the equalizer, so as to disable equalization; when the absolute value of the difference between the voltage loop reference value and the output voltage of the equalizer is greater than $V_{on}$, turning on the drive circuit and PID regulator of the equalizer, so as to re-enable the equalization, where $I_{off}$ is a threshold current for disabling the equalization, $V_{off}$ is a threshold voltage for disabling the equalization, $V_{on}$ is a threshold voltage for re-enabling the equalization, the three are all determined by actual demand, and $V_{on} > V_{off}$.

Further, the main circuit may have a structure of a bidirectional isolated converter, and the drive circuit may be a switch tube circuit converting a low-voltage PWM signal output from the controller into an isolated high-voltage PWM signal to drive the converter.

The present disclosure has the following beneficial effects:

1. The decentralized active equalization method for a cascaded lithium-ion battery pack of the present disclosure cancels the centralized controller and a communication link, and each battery cell has an independent equalizer connected to the bus, thereby avoiding the problem that in the prior art, the cascaded lithium-ion battery pack cannot be equalized in case of a centralized controller failure or a communication failure.

2. The present disclosure can make the equalizer work at high efficiency by configuring parameters of C, K, and R, and speeds up the equalization or improves the equalization accuracy.

3. The present disclosure uses a bus structure, which can achieve the equalization of all battery cells at the same time, thereby greatly improving the equalization speed.

4. The present disclosure uses a modular design and can be arbitrarily configured according to the scale of the cascaded lithium-ion battery pack, and has strong scalability.

DETAILED DESCRIPTION OF THE EMBODIMENTS

The present disclosure is described in further detail below with reference to the accompanying drawings and embodiments.

Figure 1:
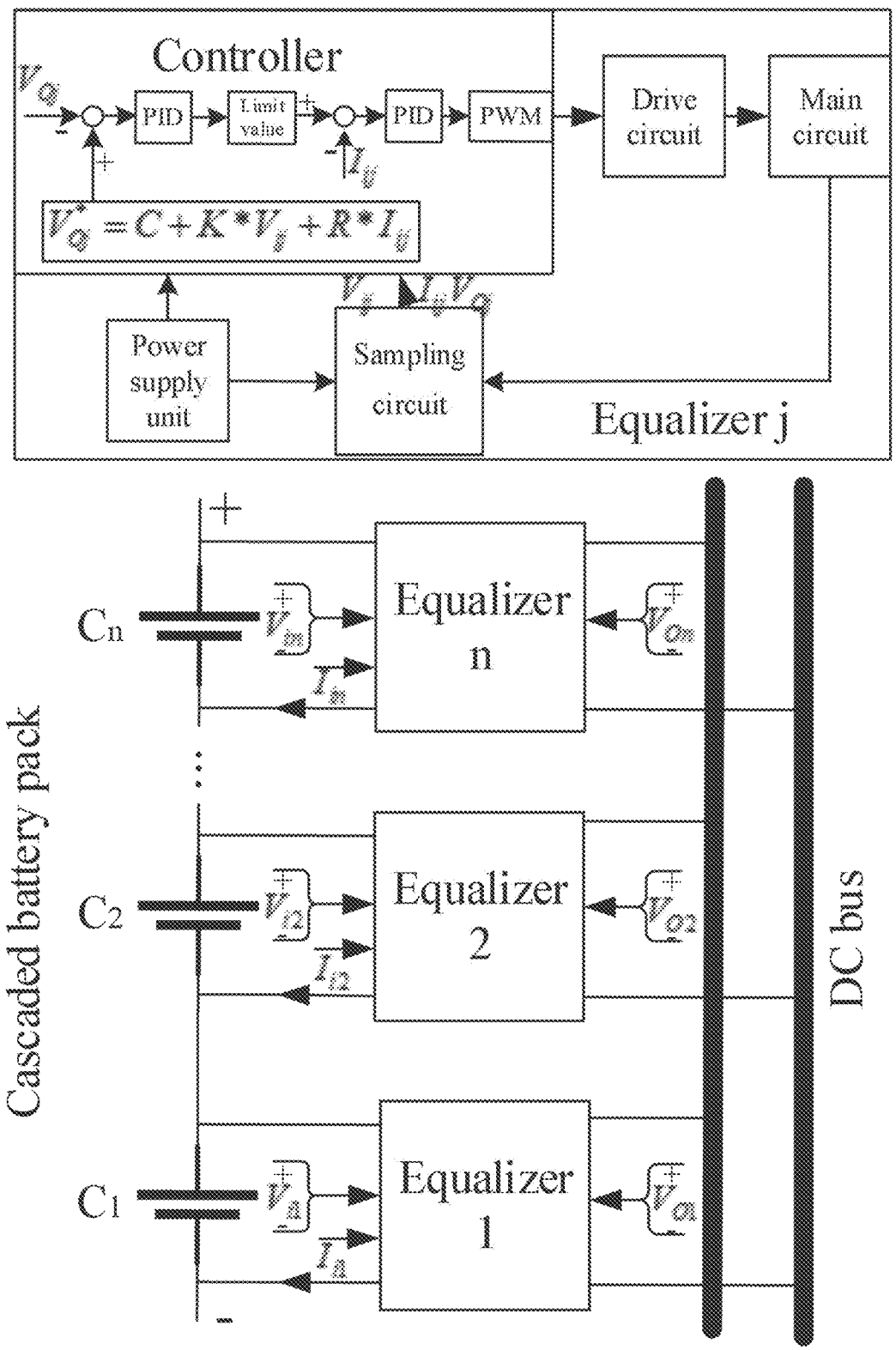
FIG. 1 shows a system structure and control block diagram of decentralized active equalization of a battery, where the figure includes n cascaded battery cells, n equalizers, and a DC bus, each equalizer includes an independent controller, a sampling circuit, a power supply circuit, a drive circuit, and a main circuit, and each battery cell is connected to an input terminal of the equalizer respectively, and an output terminal of the equalizer is connected to the DC bus.
Figure 2:
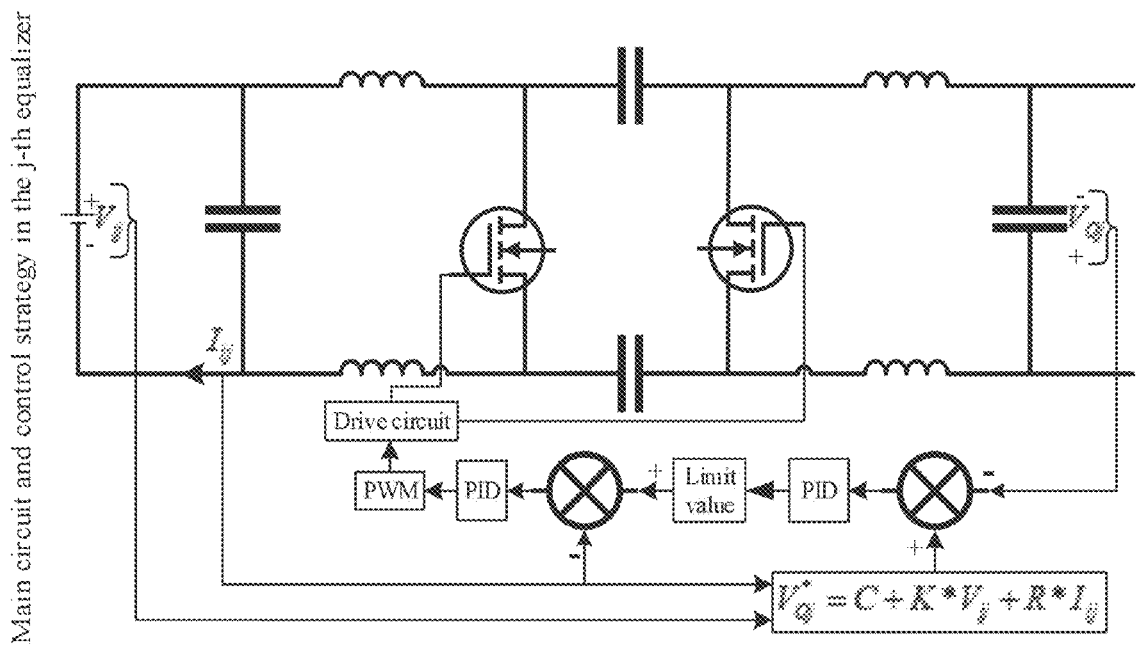
FIG. 2 shows a structure and control block diagram of the main circuit in each equalizer.

In the present embodiment, a decentralized active equalization method for a cascaded lithium-ion battery pack, as shown in FIG. 1, includes: connecting each battery cell in the cascaded lithium-ion battery pack to a DC bus through an equalizer respectively, where each equalizer includes an independent controller, a sampling circuit, a power supply circuit, a drive circuit, and a main circuit; connecting an input terminal of the main circuit to a corresponding battery cell, connecting an output terminal of the main circuit to the DC bus, supplying power to the controller and the sampling circuit by the power supply circuit, sampling an input voltage, an input current, and an output voltage of the equalizer by the sampling circuit, processing sampling data of the sampling circuit and sending a control signal to the drive circuit by the controller, and generating a drive signal by the drive circuit to drive the main circuit. In the present embodiment, the main circuit has a structure of a bidirectional isolated CUK converter, and the drive circuit is a switch tube circuit converting a low-voltage PWM signal output from the controller into an isolated high-voltage PWM signal to drive the converter. As shown in FIG. 2, the drive circuit converts the low-voltage complementary PWM signal with a dead zone output from the controller into the isolated high-voltage PWM signal to drive two field effect transistors of the bidirectional isolated CUK converter respectively.

In the present embodiment, an equalization principle of the decentralized active equalization method for a cascaded lithium-ion battery pack is as follows.

When each equalizer is in a stable state, the output voltage of the equalizer is equal to a voltage loop reference value, and when each battery is in disequilibrium, the voltage loop reference value of each equalizer is different, so there is a large deviation at each point on the DC bus, leading to a circulating current, that is, the current flows from a terminal with a higher voltage to a terminal with a lower voltage. Because the DC bus resistance is small, even a small deviation will lead to a large current, such that the battery cell with a large SOC can charge the battery cell with a small SOC.

When the equalization is almost completed, the line impedance on the DC bus is small, so when the DC bus current is small, it can be considered that the voltage on the DC bus is equal everywhere. Since the output voltage is equal to the voltage loop reference value when the equalizer is in the stable state, the following is obtained:

$$C+K^*V_{i1}+R^*I_{i1}=C+K^*V_{i2}+R^*I_{i2}=\ldots=C+K^*V_{in}+R^*I_{in}.$$

C is offset to obtain:

$$K^*V_{i1}+R^*I_{i1}=K^*V_{i2}+R^*I_{i2}=\ldots=K^*V_{in}+R^*I_{in}.$$

When the equalization is almost completed, the equalizing current is extremely small, so the term $R*I_{i1}$ can be ignored, j=1, 2, 3, . . . , n, and the following is obtained:

$$K*V_{i1}=K*V_{i2}= \ldots =K*V_{in}.$$

Therefore, the terminal voltage of the battery cells is equal, and the batteries are under the same condition at this time, so it can be considered that the SOC of the battery cells is equal.

The input voltage, output voltage, and input current of the equalizer are sampled, and then the average input current is obtained by digital low-pass filtering of the input current. Then, the voltage loop reference value is calculated, and then is compared with the sampled output voltage, and a difference between them is sent to the PID controller. After an output value of the PID controller is limited, it is used as the reference of a current loop and compared with the average input current. An output value of the current loop is sent to a PWM generator to generate the complementary PWM signal with a dead zone, and then drive two metal oxide semiconductor field effect transistors (MOSFETs) of the CUK converter respectively through the drive circuit.

In the present embodiment, the equalizer uses voltage and current double closed-loop control, and the controller calculates a voltage loop reference value $V*_{Oj}$ according to the following formula:

$$V*_{Oj}=C+K*V_{ij}+R*I_{ij}.$$

j is a serial number of the equalizer, and j=1, 2, 3, . . . , n. $V_{ij}$ is the input voltage of the equalizer and a real-time terminal voltage of a corresponding battery cell, and is acquired by the sampling circuit. $I_{ij}$ is an average input current of the equalizer, the average input current is obtained by digital low-pass filtering of the input current acquired by the sampling circuit, the average input current is an equalizing current, and a battery cell discharge direction is positive. C, K, and R are constants, and the parameters K, C, and R of equalizers are the same. The values of C and K can be selected to determine a bus voltage range, such that the equalizer is at a high efficiency point. Increasing K can speed up the equalization but reduce the equalization accuracy, so it needs to be selected reasonably according to the performance index requirements. A general lithium-ion battery model is:

$$V=V_{oc}-R_o*i.$$

It can be seen that a greater current indicates a greater deviation between the terminal voltage and an open-circuit voltage $V_{oc}$, thereby reducing the equalization speed, so it is optimal to just compensate for the internal resistance. However, since the internal resistance is generally difficult to measure, the compensation amount R can be selected to be K−1 times or even less than a nominal value of the internal resistance of a lithium-ion battery to avoid over-compensation.

Since the lithium-ion battery has a maximum charge and discharge current limit, it is necessary to limit the equalizing current. The voltage loop reference value is compared with the sampled input voltage, a difference is input to a PID regulator of the controller, an output value of the PID regulator is limited and a value after limiting is used as a current loop reference value, and the limit value is:

$$I_+=I_{max}-I, \text{ and}$$

$$I_-=-I-I_{max}.$$

$I_{max}$ is a maximum charge and discharge current of the battery cell, I is a current of the cascaded lithium-ion battery pack, $I_+$ is a positive limit value, and $I_-$ is a negative limit value. The current loop reference value is compared with the average input current, a difference is input to the PID regulator of the controller, an output value of the PID regulator is sent to a PWM generator of the controller, and the PWM generator generates a PWM signal and then inputs the PWM signal to the drive circuit so as to generate a drive signal to drive the main circuit.

A control strategy of the equalizer includes the following steps.

When an absolute value of the equalizing current is less than $I_{off}$ and an absolute value of a difference between the voltage loop reference value and the output voltage of the equalizer is less than $V_{off}$, the drive circuit and the controller of the equalizer are turned off, so as to disable equalization. When the absolute value of the difference between the voltage loop reference value and the output voltage of the equalizer is greater than $V_{on}$, the drive circuit and the controller of the equalizer are turned on, so as to re-enable the equalization, and $V_{on}>V_{off}$, $I_{off}$ and $V_{off}$ are a threshold current and a threshold voltage for disabling the equalization, $V_{on}$ is a threshold voltage for re-enabling the equalization, the three should all be determined by actual demand, and $V_{on}>V_{off}$. If the requirements for the equalization accuracy are low or the equalization speed is pursued, $I_{off}$ and $V_{off}$ can be increased appropriately, and if the requirements for the equalization accuracy are high, they can be decreased.

Figure 3:
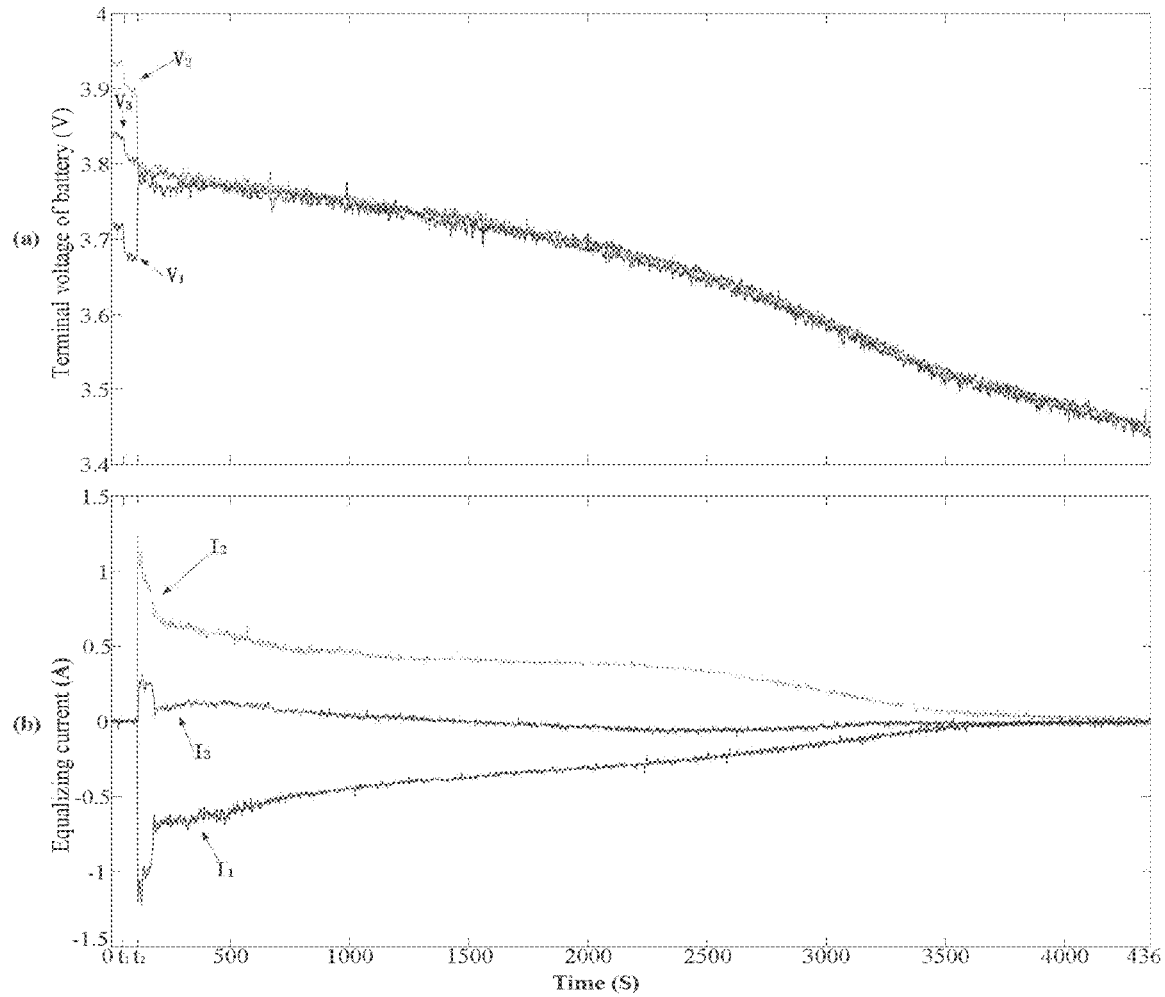
FIG. 3 is an experimental waveform diagram under a condition that a cascaded lithium-ion battery pack supplies power to a constant resistance device.

Taking equalization of a cascaded lithium-ion battery pack composed of three 18650 lithium-ion batteries with a capacity of 2 Ah as an example, an experimental waveform diagram of equalization under a condition that the cascaded lithium-ion battery pack supplies power to a constant resistance device with a resistance of 40 ohms is shown in FIG. 3 of the description. Before the experiment is started, the open-circuit voltage of the batteries is measured as $V_{i1}$=3.733 V, $V_{i2}$=3.962 V, and $V_{i3}$=3.863 V respectively. During the period from 0 to $t_1$ (0<t<$t_1$), the cascaded lithium-ion battery pack does not supply power to the external device. From $t_1$ (t>$t_1$), the cascaded lithium-ion battery pack supplies power to the external device. It can be seen that each terminal voltage instantaneously decreases at $t_1$. During the period from 0 to $t_2$ (0<t<$t_2$), the output terminals of the equalizers are not connected to the bus, that is, equalization is not started. It can be seen that each equalizing current is 0. At $t_2$, the output terminals of the equalizers are connected to the bus, and equalization is started. It can be seen that the second battery cell with the highest terminal voltage (corresponding to $V_2$ in the figure) and the third battery cell with the next highest terminal voltage (corresponding to $V_3$ in the figure) charge the first battery cell with the lowest terminal voltage (corresponding to $V_1$ in the figure). A greater voltage deviation between the battery cells indicates a greater equalizing current. A terminal voltage difference between the second battery cell and the first battery cell is greater than that between the third battery cell and the first battery cell, so it can be seen that the equalizing current $I_2$ is greater than $I_3$. After $t_2$, each terminal voltage is basically the same, which is caused by the characteristics of the lithium-ion battery and does not mean that the equalization is completed. At this time, the compensation item in the control strategy starts to work, so that each equalizing current is not too small. It can be seen that the equalizing currents continue to decrease with the equalization time until they are all very close to 0. At this time, it can be considered that the equalization is basically completed. After standing for one hour, the open-circuit voltage of the battery cells is $V_{i1}$=3.514 V, $V_{i2}$=3.520 V, and $V_{i3}$=3.518 V respectively, and a maximum open-circuit voltage deviation is 0.006 V.

Figure 4:
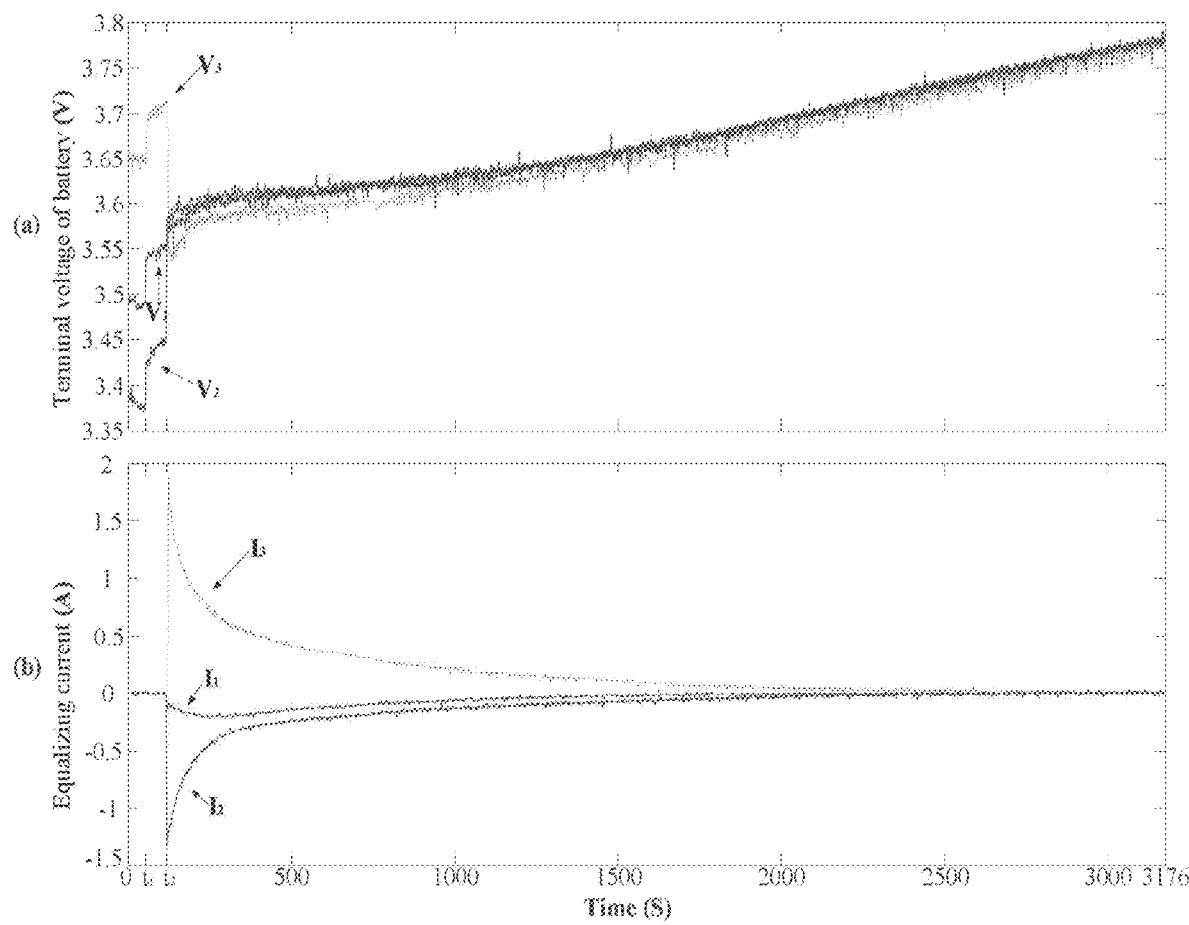
FIG. 4 is an experimental waveform diagram under a condition that the cascaded lithium-ion battery pack is charged at a constant current.

An experimental waveform diagram of equalization under a condition that an external power supply charges the cascaded lithium-ion battery pack at a constant current of 0.5 A is shown in FIG. 4 of the description. Before the experiment is started, the open-circuit voltage of the batteries is measured as $V_{i1}$=3.518 V, $V_{i2}$=3.413 V, and $V_{i3}$=3.681 V respectively. During the period from 0 to $t_1$ (0<t<$t_1$), the cascaded lithium-ion battery pack is not charged. From $t_1$ (t>$t_1$), the cascaded lithium-ion battery pack is charged. It can be seen that each terminal voltage instantaneously rises at $t_1$. During the period from 0 to $t_2$ (0<t<$t_2$), the output terminals of the equalizers are not connected to the bus, that is, equalization is not started. It can be seen that each equalizing current is 0. At $t_2$, the output terminals of the equalizers are connected to the bus, and equalization is started. It can be seen that the third battery cell with the highest terminal voltage (corresponding to $V_3$ in the figure) charge the first battery cell with the next lowest terminal voltage (corresponding to $V_1$ in the figure) and the second battery cell with the lowest terminal voltage (corresponding to $V_2$ in the figure). A greater voltage deviation between the battery cells indicates a greater equalizing current. A terminal voltage difference between the second battery cell and the third battery cell is greater than that between the first battery cell and the third battery cell, so it can be seen that the equalizing current $I_2$ is greater than the equalizing current After $t_2$, each terminal voltage is basically the same, which is caused by the characteristics of the lithium-ion battery and does not mean that the equalization is completed. At this time, the compensation item in the control strategy starts to work, so that each equalizing current is not too small. It can be seen that the equalizing currents continue to decrease with the equalization time until they are all very close to 0. At this time, it can be considered that the equalization is basically completed. After standing for one hour, the open-circuit voltage of the battery cells is $V_{i1}$=3.736 V, $V_{i2}$=3.735 V, and $V_{i3}$=3.732 V respectively, and a maximum open-circuit voltage deviation is 0.004 V.

Finally, it should be noted that the above embodiment is only intended to explain, rather than to limit, the technical solutions of the present disclosure. Although the present disclosure is described in detail with reference to the preferred embodiment, those ordinarily skilled in the art should understand that modifications or equivalent substitutions made to the technical solutions of the present disclosure without departing from the spirit and scope of the technical solution of the present disclosure should be included within the scope of the claims of the present disclosure.

What is claimed is:

1. A decentralized active equalization method for a cascaded lithium-ion battery pack, comprising:

connecting each battery cell in the cascaded lithium-ion battery pack to a direct current (DC) bus through an equalizer respectively, wherein each equalizer comprises a controller, a sampling circuit, a power supply circuit, a drive circuit, and a main circuit;

connecting an input terminal of the main circuit to a corresponding battery cell, connecting an output terminal of the main circuit to the DC bus, supplying power to the controller and the sampling circuit by the power supply circuit, sampling an input voltage, an input current, and an output voltage of the equalizer by the sampling circuit, processing sampling data of the sampling circuit and sending a control signal to the drive circuit by the controller, and generating a drive signal by the drive circuit to drive the main circuit, wherein the equalizer uses voltage and current double closed-loop control, and a voltage loop reference value $V^*_{Oj}$ is calculated according to the following formula:

$$V^*_{Oj} = C + K^*V_{ij} + R^*I_{ij},$$

where j is a serial number of the equalizer, and j=1, 2, 3, . . . , n; $V_{ij}$ is the input voltage of the equalizer and a real-time terminal voltage of a corresponding battery cell, and is acquired by the sampling circuit; $I_{ij}$ is an average input current of the equalizer, the average input current is obtained by digital low-pass filtering of the input current acquired by the sampling circuit, the average input current is an equalizing current, and a battery cell discharge direction is positive; C, K, and R are constants;

the voltage loop reference value is compared with the sampled input voltage, a difference is input to a proportional-integral-derivative (PID) regulator of the controller, an output value of the PID regulator is limited and a value after limiting is used as a current loop reference value, and the limit value is:

$$I_+ = I_{max} - I, \text{ and } I_- = -I - I_{max},$$

where $I_{max}$ is a maximum charge and discharge current of the battery cell, I is a current of the cascaded lithium-ion battery pack, $I_+$ is a positive limit value, and L is a negative limit value;

the current loop reference value is compared with the average input current, a difference is input to the PID regulator of the controller, an output value of the PID regulator is sent to a pulse width modulation (PWM) generator of the controller, and the PWM generator generates a PWM signal and then inputs the PWM signal to the drive circuit so as to generate a drive signal to drive the main circuit; and a control strategy of the equalizer comprises the following steps:

when an absolute value of the equalizing current is less than $I_{off}$ and an absolute value of a difference between the voltage loop reference value and the output voltage of the equalizer is less than $V_{off}$, turning off the drive circuit and the PID regulator of the equalizer, so as to disable equalization;

when the absolute value of the difference between the voltage loop reference value and the output voltage of the equalizer is greater than $V_{on}$, turning on the drive circuit and PID regulator of the equalizer, so as to re-enable the equalization, wherein $I_{off}$ is a threshold current for disabling the equalization, $V_{off}$ is a threshold voltage for disabling the equalization, $V_{on}$ is a threshold voltage for re-enabling the equalization, the three are all determined by actual demand, and $V_{on} > V_{off}$.

2. The decentralized active equalization method for a cascaded lithium-ion battery pack according to claim 1, wherein:

the main circuit has a structure of a bidirectional isolated converter, and the drive circuit is a switch tube circuit converting a low-voltage PWM signal output from the controller into an isolated high-voltage PWM signal to drive the bidirectional isolated converter.

* * * * *